(12) United States Patent
Ammouri et al.

(10) Patent No.: US 8,370,088 B2
(45) Date of Patent: Feb. 5, 2013

(54) METHOD FOR THE REAL-TIME DETERMINATION OF THE FILLING LEVEL OF A CRYOGENIC TANK

(75) Inventors: Fouad Ammouri, Massy (FR); Florence Boutemy, Paris (FR); Jonathan Macron, Paris (FR); Alain Donzel, Saint Martin d'Uriage (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 351 days.

(21) Appl. No.: 12/738,271

(22) PCT Filed: Oct. 16, 2008

(86) PCT No.: PCT/FR2008/051868
§ 371 (c)(1),
(2), (4) Date: Apr. 15, 2010

(87) PCT Pub. No.: WO2009/053648
PCT Pub. Date: Apr. 30, 2009

(65) Prior Publication Data
US 2010/0241371 A1    Sep. 23, 2010

(30) Foreign Application Priority Data
Oct. 26, 2007    (FR) .................................... 07 58609

(51) Int. Cl.
*G01F 23/14*    (2006.01)
(52) U.S. Cl. ............ 702/55; 702/156; 702/182; 73/301; 73/25.03; 73/295; 73/204.11

(58) Field of Classification Search .................... 702/55, 702/156, 182; 703/2; 73/301, 25.03, 295, 73/204.11, 61.59, 201, 198; 700/281
See application file for complete search history.

(56) References Cited

U.S. PATENT DOCUMENTS 3,371,534 A    3/1968    Akely
(Continued)

FOREIGN PATENT DOCUMENTS

CA    2 397 029    8/2002
EP    1 191 276    3/2002
(Continued)

OTHER PUBLICATIONS

International Search Report for PCT/FR2008/051911 dated Apr. 17, 2009.
(Continued)

*Primary Examiner* — Carol Tsai
(74) *Attorney, Agent, or Firm* — Elwood L. Haynes

(57) ABSTRACT

The invention relates to a method for the real-time determination of the filling level of a cryogenic tank intended to house a two-phase liquid/gas mixture, in which at least one of the the level, volume or mass contained in the tank is calculated for the liquid or the gas at each time step. The method includes the use of a thermal model at each time step to calculate the average temperatures of the liquid and the gas in the tank on the basis of the measured pressure differential and at least one of the pressures of said differential; calculation of the change over time in at least the density of the liquid on the basis of the average temperature of the liquid and the pressures in the tank.

23 Claims, 2 Drawing Sheets

U.S. PATENT DOCUMENTS

| | | | | |
|---|---|---|---|---|
| 4,602,344 A | * | 7/1986 | Ferretti et al. | 702/55 |
| 4,736,329 A | * | 4/1988 | Ferretti et al. | 700/281 |
| 4,782,451 A | | 11/1988 | Mazzarella et al. | |
| 4,788,648 A | * | 11/1988 | Ferretti et al. | 702/55 |
| 5,333,498 A | * | 8/1994 | Brackett et al. | 73/304 R |
| 5,487,300 A | * | 1/1996 | Brackett et al. | 73/61.59 |
| 2,765,326 A | | 5/2000 | Ferenczi et al. | |
| 2,765,205 A1 | | 2/2002 | Dulphy-Vigor et al. | |
| 6,782,339 B2 | * | 8/2004 | Neeser et al. | 702/156 |
| 6,932,028 B1 | * | 8/2005 | Hatfield et al. | 122/508 |
| 6,938,635 B2 | * | 9/2005 | Bolland | 137/2 |
| 7,017,407 B1 | * | 3/2006 | Hatfield et al. | 73/290 R |
| 7,539,593 B2 | * | 5/2009 | Machacek | 702/127 |
| 2004/0236536 A1 | * | 11/2004 | Neeser et al. | 702/156 |
| 2006/0070438 A1 | * | 4/2006 | Hatfield et al. | 73/301 |
| 2008/0270162 A1 | * | 10/2008 | Machacek | 705/1 |
| 2010/0250157 A1 | * | 9/2010 | Ammouri et al. | 702/55 |
| 2010/0294021 A1 | * | 11/2010 | Makino et al. | 73/25.03 |

FOREIGN PATENT DOCUMENTS

| | | | |
|---|---|---|---|
| EP | 1 286 105 | | 2/2003 |
| EP | 1 406 053 | | 4/2004 |
| EP | 1 712 831 | | 10/2006 |
| FR | 1 481 242 | | 5/1967 |
| FR | 2 554 230 | | 5/1985 |
| FR | 2 765 205 | | 12/1998 |
| FR | 2 765 326 | | 12/1998 |
| FR | 2 811 752 | | 1/2002 |
| FR | 2 841 963 | | 1/2004 |
| JP | 2003254811 A | * | 9/2003 |

OTHER PUBLICATIONS

French Search Report for FR 0702930 dated Apr. 24, 2008.
International Search Report for PCT/FR2008/051868.
International Search Report for co-pending PCT/FR2008/051866.

* cited by examiner

METHOD FOR THE REAL-TIME DETERMINATION OF THE FILLING LEVEL OF A CRYOGENIC TANK

This application is a 371 of International PCT Application PCT/FR2008/051868, filed Oct. 16, 2008, the entire contents of which are incorporated herein by reference.

FIELD OF THE INVENTION

The present invention relates to a method for determining, in real time, the level of fill of a cryogenic tank. The invention also relates to a method of determining, in real time, the quantity of fluid that can be delivered at any moment.

This method entails knowledge of the parameters (geometry) of the tank. These parameters may be known to the system or estimated using an independent method of estimation (using radius, height, etc.).

The invention relates more particularly to a method for determining, in real time, the level of fill of a cryogenic tank intended to contain a diphasic liquid-gas mixture, in which method at least one of: the level, the volume or the mass contained in the tank is calculated at each time step for the liquid, and possibly also for the gas, the method measuring in each time step the pressure differential between the upper and lower parts of the tank and at least one of the pressures of said differential.

The invention thus relates to improvements in the measurement of level in cryogenic tanks in order to improve the efficiency of the logistic supply chain supplying these tanks with liquid. The tanks concerned comprise an internal fluid-storage tank (or internal barrel) arranged in an external tank (or external barrel) with a void between these tanks. The tanks store cryogenic liquids such as oxygen, argon, nitrogen with capacities ranging from 100 liters to 100 000 liters, for example. The storage pressures may range between 3 bar and 35 bar.

BACKGROUND

In general, truck deliveries of cryogenic liquid are based on two items of information: the moment of delivery and the deliverable quantity. The moment of delivery is based on the liquid crossing a fixed threshold (the delivery threshold generally representing 30% of the capacity of the tank). This threshold has, built into it, the uncertainty on the measurement to prevent the user of the tank ever running dry. If the measurement of the level of liquid in the tank can be made more reliable, it will be possible to lower this trigger threshold and thus reduce the frequency of deliveries and therefore the associated costs.

Knowledge of the deliverable amount of fluid in each reservoir makes it possible to determine the rounds of the delivery trucks. The closer the quantity scheduled for delivery is to the quantity actually delivered, the more closely it will be possible to adhere to the schedule of rounds thus enjoying the full potential benefit of the numerous improvements made from the logical angle.

This knowledge of the current level of fill of the tanks is obtained by measuring and calculating a representative physical parameter, for example the volume (generally used in France) or the mass (generally used in Germany).

The known techniques for estimating these parameters (volume or mass) are generally satisfactory but do not give sufficient precision or repeatability, particularly in the case of high-pressure storage tanks, and this greatly reduces the efficiency of the corresponding logistic chain.

Whatever type of measurement is used, it is necessary to know the state of the liquid in the tank in order to improve the precision of the measurement. Specifically, a volume measurement is determined by generally using a mean liquid density for each range of tank pressures. In practice, this density is dependent on the change in internal pressure and temperature. As a result, the higher the pressure in the tank, the greater the error on the volume measurement.

Measuring total mass is less dependent on the density, and this results in a better measurement. By contrast, this measurement is not enough to determine the mass capacity of a tank at the time of delivery (for that it would be necessary to know the density of the fluid, just as this is needed for calculating the volume).

One known technique for measuring the level of fluid in a cryogenic tank is to determine a liquid level using the principle of the difference in pressure over the height of the tank.

Using this technique, the volume (% V) measurement is simply obtained from measuring a pressure differential (DP) as follows:

$$\text{Vol } \% = K \cdot \text{Delta}P$$

The factor "K" is physically dependent on the density $k_O$ of the fluid and on the geometry k of the tank ($K=k/k_O$). In practice, this factor is determined and used in the configuration in such a way as to have 100% of the volume occupied by the liquid when liquid is overspilling out of the overflow (at the time of tank calibration).

The density of the liquid $k_O$, is not, in fact, constant. It varies over time as a function of the internal pressure and of the temperature of the liquid when not saturated, or when filling with a supercooled liquid. This is why the volume result yielded by the known technique is not always relevant (it is in error by about 0-10%). This phenomenon is especially keenly felt in the case of high-pressure (HP) tanks, that is to say tanks at pressures in excess of about 10 bar and notably in excess of 15 bar.

In addition, there are two additional phenomena that lead to significant spread at high pressure. Specifically, in such cases, the density of the liquid becomes very close to that of the gas, but the known measurement and estimation equipment makes no distinction between liquid and gas. In addition, the volume of gas becomes greater than that of the liquid when the delivery is triggered. By contrast, at low pressure, the density of the gas is negligible, and that is why the known techniques give better results at relatively low pressures (for example pressures of a few bar).

Liquid level estimates are generally based on regular (for example hourly) measurements of the pressure differential, of a pressure and of the geometry (diameter, height and maximum level) of the tank.

The estimation errors are therefore essentially due to:
poor conversion of a measured pressure differential into a corresponding liquid level,
the discrepancy between the measured pressure differential and the real pressure differential (the effects of measurement pipework connecting the sensors to the tank),
calibration errors (liquid density).

When it is the mass of the liquid that has to be measured (estimated), the pressure differential DP measurement is a reflection of a mass, and so independent measurements of the change in density are thus obtained. Nonetheless, it is necessary to make a distinction between two masses: the total mass before filling (gas+liquid) and the mass capacity (the mass of liquid after filling). The first can easily be obtained by measuring the pressure differential DP.

By contrast, the second entails knowledge of the characteristics and quantity of product remaining in the tank so that the quantity of liquid that a truck can actually deliver can be estimated.

Because the density varies, it is impossible, even when working with mass, to link a physical level to a geometric level.

By contrast, it is possible, for example, to define a 100% fill level, this corresponding to the maximum mass that can be placed in the tank. This mass of course corresponds to the complete filling of the tank with supercooled liquid. With such a calibration of the 100% mark, it is certain that the 100% will never be exceeded. However, the value corresponding to complete filling will never be known as this will be dependent on the conditions at the time of filling. Thus, the value of the volume is combined with the constraints on use.

Hence, whether working with mass or with volume, the liquid level or mass of liquid alone is not enough to simultaneously solve the two problems: the threshold at which a delivery is triggered and the quantity that can be delivered.

There are other measurement principles that can be used to obtain a liquid level, and these, together with their disadvantages, are listed hereinbelow:

- Measurement using a float: this is, however, tricky to do and the precision is poor with a large risk of hysteresis (friction, jamming with ice),
- Measurement using a submerged plunger: this system is simple but there is a possibility of hysteresis and the measurement is dependent on density,
- Measurement using differential hydrostatic pressure: however, it is necessary to know the density,
- Measurement using the bubbling technique: however, the measurement tube may become blocked, and an excessive gas flow rate leads to error. In addition, the measurement is dependent on the height of the head of liquid above the lower orifice of the tube and on the density and is therefore somewhat imprecise.
- Measurement using a resistive gage: however, there is a substantial dissipation of heat and the values of the resistance drift over time,
- Measurement using a superconductive gage: this technique is expensive and requires a long response time to reach the state of equilibrium,
- Measurement using a conductivity meter gage: however, this is sensitive to the conductivity of the liquid,
- Measurement using a capacitive probe: this technique is, however, sensitive to deposits in the tank, to the dielectric constant, requires extensive calibration that places additional burden on the instrumentation system,
- Measurement using Taconis tube: however, there is a great deal of evaporation of liquid and this works only for liquid helium (and what is more, there is no transmissible signal),
- Ultrasound measurement: here the result is dependent on the surface of the liquid (disturbed or froth), on the pressure, on the temperature, on the nature of the gas, on dust, on condensate, etc.,
- Measurement using a weight indicator technique: in this case, there is a need to take account of the reactions of the piping, and in addition this technique is very expensive,
- Measurement using radar: this method is robust and precise, but expensive,
- Gamma-ray measurement: however, this measurement is sensitive to the density of the product through which it is passing and is restrictive in terms of safety (radioactive source).

To sum up, either the method is precise but very expensive (and difficult to implement), or it is simple, inexpensive but too sensitive to the environment of the tank to be exploited with sufficient reliability.

It is an object of the present invention to alleviate all or some of the abovementioned disadvantages of the prior art.

SUMMARY OF THE INVENTION

The invention relates to a method for the real-time determination of the filling level of a cryogenic tank intended to house a two-phase liquid/gas mixture, in which at least one of the following variables is calculated for the liquid and optionally for the gas at each time step (t, t+?t . . .), namely, the level, volume or mass contained in the tank, whereby, at each time step, the method includes the measurement of the pressure differential (DP=PB−PH) (in Pa) between the upper and lower parts of the tank and at least one of the pressures (PH, PI) of said differential. The invention is characterized in that the method includes the following steps: use of a thermal model at each time step (t, t+?t . . .) to calculate the average temperatures of the liquid (Tl) and the gas (Tg) in the tank on the basis of the measured pressure differential (PB−PH) and at least one of the pressures (PH, PI) of said differential; calculation of the change over time (t, t+?t . . .) in at least the density of the liquid (pl) (in kg/m3) on the basis of the average temperature of the liquid (Tl) and the pressures (PH) (PB) in the tank; calculation of the liquid level (hl) (in m) in the tank by applying the general law of hydrostatics to the liquid, of type dP=−pl·g·dhl, on the basis of the calculated liquid density (pl) (wherein dP is the liquid pressure variation, pl is the density of the liquid, g is ground acceleration and dhl is the variation in the height of the liquid).

DETAILED DESCRIPTION OF THE INVENTION

Figure 1:
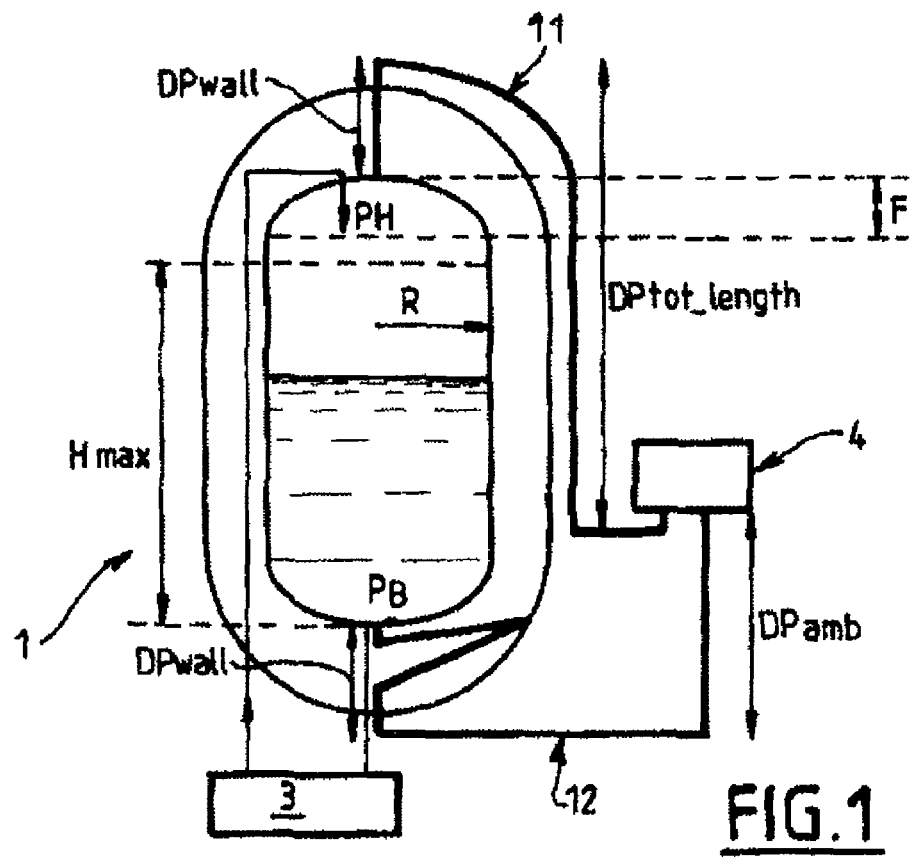
FIG. 1 depicts a schematic view illustrating a first example of a cryogenic tank for implementing the invention (with the pipework outside the walls of the tank)

To this end, the method according to the invention, in other respects in accordance with the generic definition given thereof in the above preamble, is essentially characterized in that it:

uses a thermal model at each time step to calculate the mean temperatures of the liquid and of the gas in the tank from the measured pressure differential and from at least one of the pressures of said differential, calculates the evolution over time at least of the density of the liquid from the mean temperature of the liquid and from the pressures in the tank, calculates the liquid level in the tank by applying to the liquid the general law of hydrostatics of the type: dP=−ρl·g·dhl from the calculated liquid density (with dP being the variation in pressure of the liquid, ρl being the density of the liquid, g being the Earth's acceleration due to gravity, and dhl being the variation in height of the liquid).

Unless mentioned otherwise, the physical parameters are expressed in SI units (m for distances, $m^3$ for volumes, kg for masses, $kg/m^3$ for densities, Pa for pressures or pressure differentials, etc.). Furthermore, some embodiments of the invention may comprise one or more of the following features:

the method calculates the density of the gas at each moment from, on the one hand, the mean temperature of the gas obtained and estimated at the preceding moment and, on the other hand, the pressure differential and at least one of the measured pressures of said differential, the thermal model in each time step calculates the mean temperatures of the liquid and of the gas in the tank from, on the one hand, the measured pressure differential and at least one of the pressures of said differential and, on the other hand, from the temperatures of the liquid and of the gas known during the preceding moment, the model uses, as its starting value for the temperature of the liquid and of the gas, the initial temperature values obtained during a complete filling of the tank, the level of the liquid at this known moment of complete filling being the known level of the overflow spillway of the tank, the model uses the following calculation approximation: the gas after complete filling is at liquid-vapor equilibrium at the pressure of the tank, the model uses the following calculation approximation: the liquid and the gas are constantly isothermal each in their respective volumes but at respective temperatures that may differ, the model calculates, for each time step, the mean temperatures of the liquid and of the gas in the tank from the mass and energy balances modeled and applied separately to the liquid and to the gas both contained in the tank, the mass and energy balances modeled and applied separately to the liquid and to the gas both contained in the tank are taken at a moment on the basis of the liquid and gas density and volume values calculated from an estimate of the temperatures of the liquid and of the gas at the preceding moment, and the model iterates on calculating the mean temperatures of the liquid and of the gas in the tank until such moment as the mean temperatures of the liquid and of the gas calculated at a moment converge from a predetermined value toward the temperatures estimated at the preceding moment, and, after convergence, the method recommences the steps of calculating the temperatures, liquid density and liquid level for the next moment, the mass and energy balances modeled and applied to the gas use the enthalpy equation whereby the variation in enthalpy of the gas corresponds to the exchanges of heat and of mass applied to the gas, that is to say taking account at least of one of the following exchanges: the exchange of heat between the liquid and the gas, the exchange of heat between the outside of the tank and the gas, the exchange of heat supplied by any vaporization heater generally situated underneath the tank, the vaporization of liquid in the tank, the mass and energy balances modeled and applied to the liquid use the enthalpy equation whereby the variation in enthalpy of the liquid corresponds to the exchanges of heat and of mass applied to the liquid, that is to say taking account at least of one of the following exchanges: the exchange of heat between the outside and the liquid, the exchange of heat between the gas and the liquid, the exchange of heat supplied by any vaporization heater generally situated underneath the tank, the vaporization of liquid in the tank, the consumption of liquid withdrawn by a user of the tank, the method comprises a measurement of temperature in the external vicinity of the tank so as to calculate the exchange of heat between the outside and the tank, the pressure differential between the upper and lower parts of the tank is measured by at least one remote pressure sensor connected to the upper and lower parts of the tank via respective measurement pipes, the method correcting the calculated liquid level (hl) and/or the measured pressure differential by taking account of an additional pressure difference value created by the gas present in the measurement pipes, the pressure differential measured remotely between the upper and lower parts of the tank being connected to the so-called "real" pressure differential between the upper and lower parts of the tank by the formula:

$$DP = PB - PH = DPreal - DPpipe,$$

the tank being of the double-walled type with a vacuum in the volume between the walls, characterized in that the additional pressure difference value is calculated by adding or subtracting the levels of gas and of liquid in the measurement pipes taking the calculated liquid level into account and neglecting the pressure influence of the portions of pipe lying in the space between the walls, when the upper pressure measurement pipe connected to the upper part of the tank is situated outside the tank, the additional pressure difference value is calculated using a formula of the type:

$$DPpipe = \rho g\_pipe \cdot g \cdot (2len\_w + total\_length)$$

in which $\rho g\_pipe$ is the density of the gas at ambient temperature (outside the tank), g is the Earth's acceleration due to gravity in $m/s^2$, len_w is the thickness of the wall of the tank and total_length is the total height of the internal tank, and in that, when the upper pipe is situated inside the tank in the space between the walls, the value of the additional pressure difference (DPpipe) is calculated using a formula of the type:

$$DPpipe = DPside\_gas + DPside\_liq;$$

DPside_gas being the pressure difference in that part of the pipe connected to the upper part of the tank and on the gas side of the tank, DPside_liq being the pressure difference in that part of the upper pipe lying on the liquid side of the tank; DPside_gas being obtained using the formula $DPside\_gas = \rho_{side\_gas} \cdot g \cdot hg$ in which $\rho_{side\_gas}$ is the density of the gas in the pipe calculated at a representative temperature of the pipe, g being the Earth's acceleration due to gravity and hg being the height of gas in the tank; DPside_liq being obtained using the formula $DPside\_liq = \rho_{side\_liq} \cdot g \cdot hl$ in which $\rho_{side\_liq}$ is the density of the gas in the upper pipe on the liquid side of the tank calculated at a representative temperature of the pipe, g being the Earth's acceleration due to gravity and hl the height of liquid in the tank, the method of dynamically determining the level of fill of a cryogenic tank intended to contain a diphasic liquid-gas mixture, as claimed in any one of the preceding claims, comprising a step of measuring a pressure differential between levels situated respectively at the bottom and top ends of the tank, the process comprising a calculation of a volume and/or of a mass of liquid in the tank from a measured pressure differential, from the known or estimated geometry of the tank, and from at least one density of liquid in the tank, the method further comprising the steps of calculating the following parameters for a moment (t+Δt):

a first step of calculating a density of the liquid in the tank from pressure measurements at the bottom and top ends of the tank respectively, and from the value, estimated at the preceding moment, of a temperature Tl of the liquid in the tank, a second step of calculating the level of liquid in the tank by applying to the liquid the law of hydrostatics of the type: dP=−ρl·g·dhl from the density of the liquid as calculated in the preceding step, a third step of calculating the pressure level at the interface between the liquid phase and the gas phase in the tank from the calculated level of liquid in the tank, a fourth step of calculating the volume of liquid and of gas in the tank from the liquid level calculated in the second step, a fifth step of calculating the energy balance applied to the gas in the tank using the equation stating the variation in enthalpy of the gas and taking into account at least one of the following exchanges of heat: the exchange of heat between the liquid and the gas, the exchange of heat between the outside of the tank and the gas, the exchange of heat supplied by any vaporization heater situated in the tank, and the vaporization of liquid in the tank, a sixth step of calculating the energy balance applied to the liquid in the tank from the equation stating the variation in enthalpy of the liquid and taking into account at least one of the following exchanges: the exchange of heat between the outside and the liquid, the exchange of heat between the gas and the liquid, the exchange of heat supplied by any vaporization heater situated in the tank, and the vaporization of liquid in the tank, a seventh step of calculating the temperature Tg of the gas from the energy balance of the fifth and sixth steps, and an eighth step of comparing the temperature T(t+Δt) calculated for the moment following on from the seventh step against the temperature T(t) estimated for the preceding moment, and when the difference between the temperature T(t+Δt) calculated for the moment following on from the seventh step and the temperature T(t) estimated for the preceding moment is above a set threshold: a step of returning to the second step and of iterating until convergence is reached, when the difference between the temperature T(t+Δt) calculated for the moment following on from the seventh step and the temperature T(t) estimated for the preceding moment is below a threshold (convergence is reached): repeating the above steps for the moment (t+2Δt) using the pressure values measured for that moment.

Figure 2:
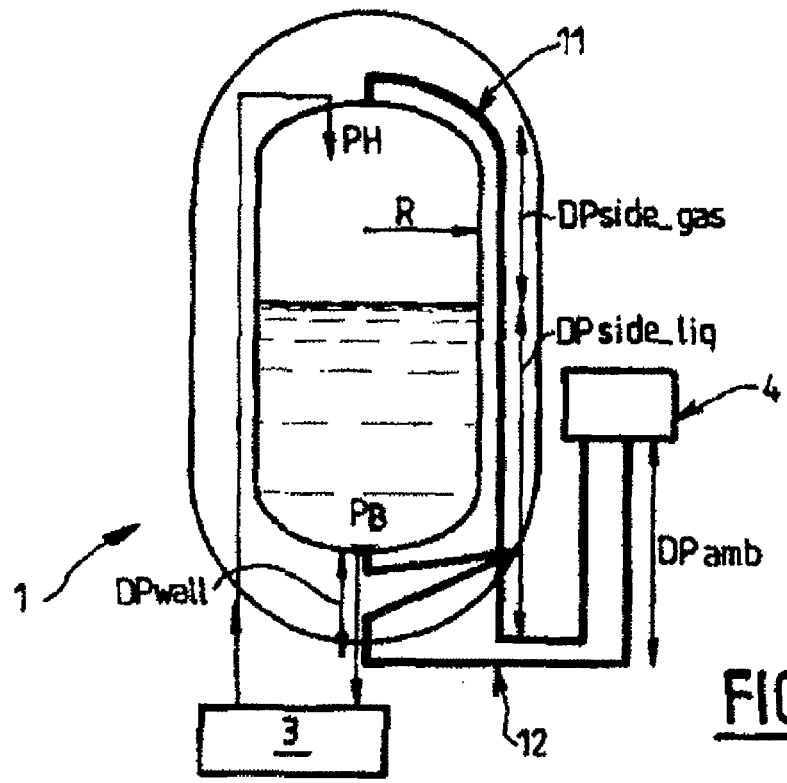
FIG. 2 depicts a schematic view illustrating a second example of a cryogenic tank for implementing the invention (pipework inside the walls of the tank)
Figure 3:
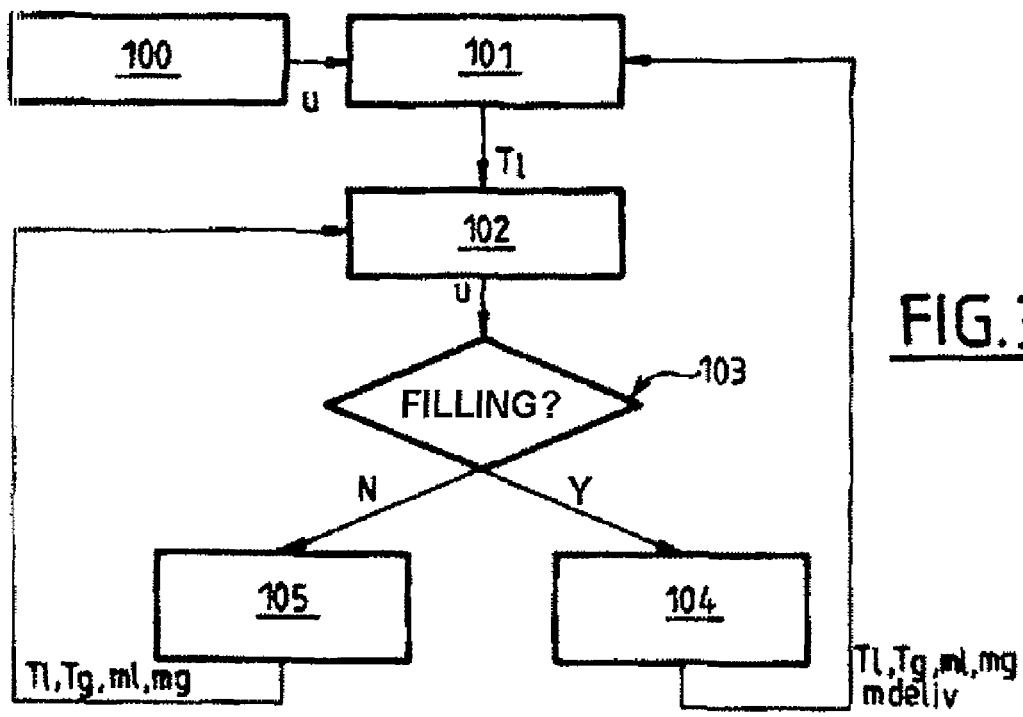
FIG. 3 depicts, partially and in a simplified fashion, some steps implemented by the method according to the invention.
Figure 4:
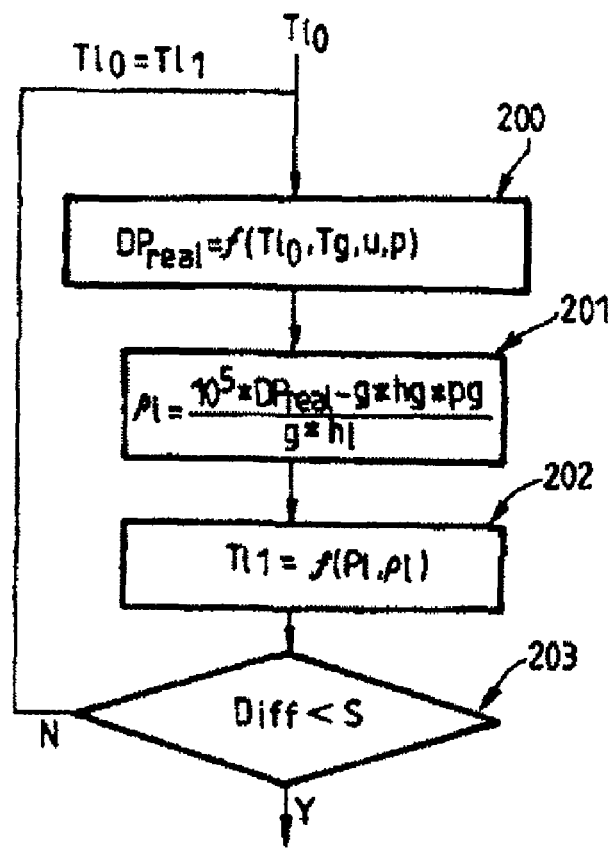
FIG. 4 depicts in a partial and simplified fashion some initialization steps implemented by the method according to the invention.

Other specific features and advantages will become apparent from reading the description hereinafter, given with reference to the figures in which:

FIG. 1 depicts a schematic view illustrating a first example of a cryogenic tank for implementing the invention (with the pipework outside the walls of the tank), FIG. 2 depicts a schematic view illustrating a second example of a cryogenic tank for implementing the invention (pipework inside the walls of the tank), FIG. 3 depicts, partially and in a simplified fashion, some steps implemented by the method according to the invention, FIG. 4 depicts in a partial and simplified fashion some initialization steps implemented by the method according to the invention.

The method of estimation that is about to be described hereinbelow can be implemented by a computer of a (local or remote) tank control system. This method comprises a pressure measurement (differential DP), an estimate and may comprise remote transmission. The pressures are measured via pipework 11, 12 which may be situated in the space between the walls of the tank (FIG. 2) or outside 11 (FIG. 1).

The tank 1 comprises a pressurizing device such as a vaporization heater 3 able to tap off liquid, vaporize it, and reinject it into the tank. This heater 3 regulates the pressure within the tank 1 in the conventional way.

For simplicity, the interior tank that stores the fluid will hereinafter be denoted merely by the term "tank".

The liquid supplied by truck at fillings may also be considered to be in a state of equilibrium (temperature range of 10° K. around equilibrium, for example 77.2 to 87.9 K in the case of nitrogen). The pressure of the liquid in the truck is chosen, according to the pressure of the tank, between 1 and 2 bar. The liquid is introduced into the tank by pumping it.

When liquid is being transferred from a truck to the tank, liquid which, in relative terms, is colder, is added to the liquid which, in relative terms, is hotter, contained in the tank. When liquid is coming out of the overflow, the tank is full. After filling, the vaporization heater 3 modifies the pressure if necessary. Thus, during filling, some of the liquid is consumed to increase and stabilize the pressure (this representing of the order of 4 kg for a 10 000-liter tank).

Between two fillings, the tank 1 is subjected to the following phenomena:

the quantity of liquid decreases (is consumed by the user) and the corresponding drop in pressure is corrected by the heater 3, heat enters the tank (by conduction, radiation).

After a certain time of equilibrium, liquid vaporizes in the tank and this contributes to a loss of liquid. In addition, the density of the liquid changes and the liquid level is higher than if it had maintained its delivery temperature.

According to an advantageous particular feature, temperatures specific to the gas and to the liquid in the tank are considered, but without these temperatures being dependent on the location within the tank. What that means to say is that in what follows, the gas temperatures Tg and liquid temperatures Tl are mean temperatures.

According to one advantageous particular feature, the pressure at the interface between the liquid phase and the gaseous phase is taken to be the mean of the pressures at the bottom and at the top (PB and PH).

For preference, the energy balance equations are applied separately to the gaseous and liquid phases in the tank.

The method does not measure the level of liquid in the tank directly but estimates it on the basis of a measurement of a pressure differential DP=PB−PH between the upper PH and lower PB parts of the tank 1 and on the basis of a pressure (PB or PH).

The estimated liquid level is based on the pressure differential DP=PB−PH measured between the bottom and top ends of the tank.

According to the current method, the calculated height of liquid hl1 (in m) is calculated using the formula (equation 1):

$$hl1 = \frac{DP(inPa)}{\rho l1 \cdot g}$$

Where ρl1 is a calibration liquid density value in kg/m³ that is constant (but can be altered by an operator); g being the acceleration of the Earth's gravitational field, in m/s².

Because the tank is not a geometrically perfect cylinder (it has elliptical ends, cf. FIGS. 1 and 2), the volume Vl1 of liquid uses two equations according to whether the liquid is at a level below or above the elliptical part F (equations 2):

If hl1 is in the elliptical zone F $$\text{then} \Rightarrow Vl1 = \pi R^2 \left[ hl1 - \frac{F}{3} \right]$$

$$\text{else} \Rightarrow Vl1 = \frac{2}{3}\pi F R^2 - \pi(F - hl1)\left[ R^2 - \frac{R^2}{3F^2}(F - hl1)^2 \right]$$

R being the radius of the tank (in its cylindrical portion).

The maximum volume Vlmax of liquid in the tank 1 is calculated by replacing the liquid height value hl1 in equation 2 with the maximum liquid height Hmax (equation 3):

$$Vl\max = \pi R^2 \left[ H\max - \frac{F}{3} \right]$$

The total percentage of liquid %Vl in the tank is calculated using the next equation (equation 4):

$$\% Vl = 100 \frac{Vl1}{Vl\max}$$

The mass of liquid contained in the tank ml1 is deduced using the density of the liquid ρl1 (equation 5):

ml1=ρl1 Vl1

Using equations 1, 2 and 5 above, the mass of liquid ml1 can be expressed as a function of the measured pressure differential DP=PB−PH (in Pa).

Depending on whether the liquid level hl1 is in the elliptical zone F (cf. scenario (a) below) or below it (cf. scenario (b) below), the equation becomes (equation 6):

$$\text{scenario } (a) \Rightarrow ml1 = \pi R^2 \left[ \frac{DP}{g} - \frac{\rho l1 F}{3} \right]$$

scenario (b) ⇒

$$ml1 = \frac{2}{3}\rho l1 \pi F R^2 - \pi\left(\rho l1 F - \frac{DP}{g}\right) * \left[ R^2 - \frac{R^2}{3F^3}\left(F - \frac{DP}{\rho l1 \cdot g}\right)^2 \right]$$

For preference, according to one possible advantageous feature of the invention, the calculated liquid level hl1 is corrected to take account of an additional pressure difference value DPpipe created by the gas present in the measurement pipes 11, 12 both when the pipes 11 are situated inside the tank (FIG. 2) or outside the tank (FIG. 1).

What that means to say is that the pressure sensors 4 are remote and "read" pressures that have been influenced by the fluid in the pipework 11, 12 that connects them to the top and bottom parts of the tank.

The pressure differential DP=PB−PH measured remotely between the top and bottom parts of the tank being connected to the so-called "real" pressure differential DPreal between the top and bottom parts of the tank by the formula: PB−PH=DPreal−DPpipe.

Scenario in which the pipework is outside the wall of the tank (FIG. 1):

In this scenario, the relationship between the "real" pressures PHr, PBr, the real pressure differential DPreal=PBr−PHr and the measured differential DP=PB−PH is (equation 7): (cf. FIG. 5).

$$\begin{cases} PH = PHr - DPwall + DPtot\_length \\ PB = PBr + DPwall - DPamb \end{cases}$$

with $$\begin{cases} DPtot\_length = \rho g\_pipe \cdot g(len\_w + total\_length - hl1) \\ DPamb = \rho g\_pipe \cdot g(hl1 + len\_w) \\ DPwall = g \int_{t1}^{thick\_w} \rho g(T(x), P) dx \end{cases}$$

DPwall being the pressure differential between the two ends of the vertical pipework passing through the space between the walls (at the top or at the bottom).

DPtot_length being the pressure difference due to the pressure of gas in the part of the pipework 11 connecting the uppermost point to the remote measurement member 4 (sensor).

DPamb is the pressure difference due to the pressure of gas in the part of pipework 11 connecting the lowermost point to the remote measurement member 4 (sensor).

ρg_pipe being the density of the gas in the pipework.

thick_w being the thickness of the wall of the tank, T(x) being the temperature at the point x and P the pressure.

In this equation 7, the pressure differential DPwall between the two ends of the vertical pipework passing through the space between the walls (at the top or at the bottom) can be considered to be substantially identical at the top and bottom parts (only the fact that there is gas in the pipework). Consider now the shape of the lower pipework 12 in the space between the walls: the pipework runs close to the outer barrel to "pick up" energy external to the tank and completely vaporize the fluid in the measurement pipework 12. Between the upper and lower ends of this portion, the pressure is substantially the same (a differential of 0.5 bar at most).

In equation 7, ρg_pipe is the density of gas at ambient temperature (the external pipework 11, 12 is preferably not insulated).

The real pressure differential DPreal=PBr−PHr can be deduced from the measured pressure differential DP=PB−PH using the formula:

DP=PB−PH

DPreal=DP−2DPwall+ρg_pipe·g(2len_w+total_length)

len_w being the thickness of the walls of the tank and total_length being the total height of the tank that forms the storage volume.

Scenario in which the pipework is in the space between the walls (FIG. 2):

Because the upper pipework 11 is close to the outer barrel, it is not possible to consider that it contains only gas at ambient temperature. There are two temperatures that have to be considered:

Tside_gas=the temperature of the gas in the upper part of the pipework 11 (adjacent to the gaseous phase), Tside_liq=the temperature of the gas in the lower part of the pipework 11 (adjacent to the liquid phase of the tank).

In order to estimate these temperatures, it is assumed that there is a linear temperature profile between ambient temperature and the cryogenic liquid of the tank. Because the temperature of the cryogenic liquid Tl is colder than the temperature of the gas Tg, the temperature profile in the pipework near the liquid is different than the temperature profile adjacent to the gas. This gives the following approximation (equation 9):

$$\text{Tside\_gas} = dpipe\left(\frac{Tamb - Tg}{\text{len\_w}}\right) + Tg$$

$$\text{Tside\_liq} = dpipe\left(\frac{Tamb - Tl}{\text{len\_w}}\right) + Tl$$

dpipe being the distance (spacing) between the upper pipework 11 and the wall of the inner tank.

In addition, even when the pipework 11 is situated on the outside, there is a pressure drop due to the gas at ambient temperature, DPamb.

There are therefore three corrective terms for the pressure measured at the upper part, each of these corrective terms (I, II, III) corresponding to a different gas density (equation 10, cf. FIG. 2):

$$\begin{cases} PH = PHr + DP\text{side\_gas} + DP\text{side\_liq} - DPamb \\ PB = PBr + DPwall - DPamb \end{cases}$$

with $DP\text{side\_gas}=\rho\text{side\_gas}\cdot g\ hg$; $\rho\text{side\_gas}=\rho g(T\text{side\_gas},P)$ $DP\text{side\_liq}=\rho\text{side\_liq}\cdot g\ hl$; $\rho\text{side\_liq}=\rho g(T\text{side\_liq},P)$ $hg=\text{total\_length}-hl$ total_length being the total height of the inner tank, hl and hg being the real heights of liquid and of gas in this barrel.

Thus, the relationship between the real pressure differential DPreal=PBr−PHr and the measured pressure differential DP=PB−PH is (equation 11):

$DP\text{real}=DP+DP\text{side\_gas}+DP\text{side\_liq}-DPwall$

The overall formula can be written (equation 12):

$DP=DP\text{real}-DP\text{pipe}=(PB-PH)-DP\text{pipe}$ with: DPpipe=

$$\begin{cases} -2\ DPwall + \rho g\_pipe \cdot g(2\text{len\_w} + \text{total\_length}) & \text{(1st scenario, figure1)} \\ DP\text{side\_gas} + DP\text{side\_liq} - DPwall & \text{(2nd scenario, figure 2)} \end{cases}$$

DPipe being the value of the additional pressure difference created by the gas present in the measurement pipes 11, 12.

Because the insulation of the internal tank (len_w) is a few centimeters thick, the pressure differential DPwall between the two ends of the vertical pipework passing through the space between the walls can be neglected. It will thus be noted that equations 11 and 8 indicate that the measured pressure differential DP underestimates the real pressure differential DPreal. Further, because the level of liquid in the internal tank and the real pressure differential DPreal are proportionate to one another, this underestimate may be significant at low liquid levels.

This underestimate is also greater in high-pressure tanks and for measurement pipework 11 situated in the space between the walls.

According to the invention, the gaseous phase in the tank is taken into consideration. The real pressure differential DPreal is, in fact (equation 13):

$DP\text{real}=[\rho g\cdot hg\cdot g+\rho l\ hl\cdot g]$

With hg and hl being the heights of gas and of liquid in the tank.

By substituting this formula in formula 12, we get (equation 14):

$DP=g\cdot\rho l\cdot hl+g\cdot\rho g\cdot hg-DP\text{pipe}$.

(the last two terms in this equation correspond respectively to the effect of the gas in the tank and to the effect of the measurement pipework).

Using equations 1 and 14 the height of liquid hl1 calculated (measured according to the prior technique) can be expressed as a function of the corrected real height of liquid hl (equation 15):

$$hl1 = \underbrace{\frac{\rho l}{\rho l 1}hl}_{A} - \underbrace{\frac{DP\text{pipe}}{\rho l\cdot g}}_{B} + \underbrace{\frac{\rho g}{\rho l 1}hg}_{C}$$

ρl1 being the liquid density calibrated as default value according to the abovementioned procedure.

ρg being the density of the gas.

The terms A, B and C of equation 15 corresponding respectively to the effects of calibration, to the effect of the measurement pipework 11, 12 and to the effect of the gas in the tank.

Thus, opting for a fixed calibration density as in the prior art generates an error that is proportionate to the difference between, on the one hand, the real density of the liquid and, on the other hand, the constant liquid density chosen at the time of calibration.

Equation 15 shows that the error in the liquid level that is due to the effect of the gas in the tank partially compensates for the error due to the effect of the measurement pipework.

By expressing the error in relation to the height of liquid, the relationship can be written (equation 16):

$$\frac{hl1-hl}{hl} = \underbrace{\frac{\rho l-\rho l 1}{\rho l 1}}_{A} - \underbrace{\frac{DP\text{pipe}}{DP}}_{B} + \underbrace{\frac{\rho g\cdot hg}{\rho l 1 hl}}_{C}$$

Terms A, B and C of equation 16 here again correspond respectively to the effects of calibration, to the effects of the measurement pipework and to the effect of the gas in the tank.

Using equation 4 it is possible to determine the volume of liquid before filling Vla (equation 17):

$$Vla = Vl\max\frac{\%Vla}{100}$$

And as a result, the delivered mass and is equal to (equation 18):

$md=(Vl\max-Vla)\rho l 1$

This level estimate does not consider the temperatures of the gas and of the liquid always to be at equilibrium (this would be untrue particularly just after filling). There are two models that can be developed in order to map the change in temperature over time (these are a so-called "detailed" model and a so-called "constant flux" model).

Detailed Model:

In order to describe the change in the liquid level and mass it is necessary to know the densities of the liquid and of the gas these themselves being dependent on temperature and pressure. The thermo-dynamic model described hereinafter allows these values to be calculated.

Assuming the gas and liquid temperatures to be homogeneous in their respective volumes and assuming constant insulation, the mass and energy balances are modeled and applied separately to the liquid and to the gas both contained in the tank.

For an open volume, the variation in mass and energy is the sum of the incoming masses minus the sum of the outgoing masses.

The tank can be split into two working volumes, one for the gaseous phase and one for the liquid phase.

By applying the mass balance to the gaseous phase (mg=gaseous mass) the following equation can be written (equation 19):

$$\frac{dm_g}{dt} = \underbrace{\dot{m}_{vap}}_{I} + \underbrace{\dot{m}_{prc}}_{II} - \underbrace{\dot{m}_{g\_air}}_{III}$$

Where $\dot{m}_{vap}$ is the mass flow rate (in m/s) of incoming gas generated by the vaporization of liquid, $\dot{m}_{prc}$ is the flow of incoming gas from the vaporizer, and $\dot{m}_{g\_air}$ is the mass flow rate of gas leaving via the safety (vent) valve.

Regarding the energy of the gaseous phase and neglecting kinetic and potential energy, the following energy balance can be written (equation 20):

$$\frac{d(m_g e_g)}{dt} = \underbrace{\dot{m}_{prc} Hg(T_{prc})}_{I} + \underbrace{\dot{m}_{vap} Hg(Teq)}_{II} - \underbrace{\dot{m}_{g\_air} Hg(Tg)}_{III} + \underbrace{Q}_{IV} - \underbrace{W}_{V}$$

eg being the energy of the gas, Hg being the enthalpy of the gas in which $Hg(T_{prc})$ is the enthalpy of the gas from the vaporizer, just before it enters the gaseous phase, Hg(Teq) is the enthalpy of the gas at equilibrium (Teq=equilibrium temperature) and Hg(Tg) is the enthalpy of the gas in the tank (at the temperature Tg of the gas).

It follows from the last equation that the variation in enthalpy is due to:

$\dot{m}_{prc} Hg(T_{prc})$=the incoming energy due to the vaporizer $\dot{m}_{vap} Hg(Teq)$=the incoming energy due to the vaporization of liquid $\dot{m}_{g\_air} Hg(Tg)$=the outgoing energy when the air vent valve is open Q=the thermal power received by the gaseous phase, which is the sum of the contribution of the gas/liquid interface and of the surface area of the internal tank in contact with the gaseous phase W=the mechanical power across the lateral surfaces of the gaseous phase.

By expressing the energy of the gas $$eg = Hg - \frac{Pg}{\rho g}$$

(Pg being the pressure of the gas and ρg being its density), the left-hand part of the energy balance formula becomes (equation 21):

$$eg\frac{dmg}{dt} + mg\frac{deg}{dt} = eg\frac{dmg}{dt} + mg\left(\frac{dHg}{dt} - \frac{1}{\rho g}\frac{dPg}{dt} - Pg\frac{d\left(\frac{1}{\rho g}\right)}{dt}\right) =$$

$$eg\frac{dmg}{dt} + mg\frac{dHg}{dt} - Vg\frac{dPg}{dt} + \frac{mgPg}{\rho g^2}\frac{d\rho g}{dt}$$

It is possible to find a relationship expressing the variation in gas density $$\frac{d\rho g}{dt}$$

according to the formula (equation 22):

$$\frac{dmg}{dt} = Vg\frac{d\rho g}{dt} + \rho g\frac{dVg}{dt}$$

(Vg=volume of gas).

If the compressibility of the gas is taken into consideration, the only mechanical power W across the surface is produced by the increase or decrease in the level of liquid (equation 23):

$$W = Pg\frac{dVg}{dt}$$

Finally, by substituting equations 20, 21, 22 into equation 23, the enthalpy balance of the gaseous phase can be written (equation 24):

$$mg\frac{dHg}{dt} =$$

$$\dot{m}_{prc}(Hg(T_{prc}) - Hg(Tg)) + \dot{m}_{vap}(Hg(Teq) - Hg(Tg)) + Q + Vg\frac{dPg}{dt}$$

To simplify the model, the following approximations can be made:

In the scenario in which the pipework is between the walls: Tg≈$T_{prc}$ the temperature of the gas from the vaporizer $T_{prc}$ is substantially equal to the (mean) temperature of the gas Tg in the tank (satisfied if the vaporized gas return pipework hugs the interior tank).

In the scenario in which the pipework is outside the walls:

Tamb≈$T_{prc}$

Thus the flow $\dot{m}_{prc}$ of incoming energy due to the vaporizer is relatively low. The gas entering the vaporizer receives, from outside, energy estimated at $\dot{m}_{prc}$(Hg(Tamb)−Hl(Tl)) and redistributes this energy to the liquid and gaseous phases by exchange of heat with the tank.

The heat Q supplied to the gaseous phase can be evaluated as (equation 25):

$$Q = \begin{cases} \underbrace{hp \cdot Sq(Tamb - Tg)}_{I} + \underbrace{hlgSlg(Tl - Tg)}_{II} + \\ \underbrace{\dfrac{hg}{total\_length}\dot{m}_{prc}(Hg(Tamb) - Hl(Tl))}_{III} \\ \text{for pipework between the walls} \\ \underbrace{hp \cdot Sg(Tamb - Tg)}_{I} + \underbrace{hlgSlg(Tl - Tg)}_{II} + \underbrace{\dot{m}_{prc}(Hg(Tamb) - Hl(Tl))}_{III} \\ \text{for pipework outside the walls} \end{cases}$$

with
hp: the coefficient of exchange between the ambient environment and the gas in the tank
hlg: the coefficient of exchange of heat between the gas and the liquid in the tank $Slg = \pi R^2 =$ surface area Terms I, II and III correspond respectively to:
I=the heat from the external surroundings to the gas in the tank through the walls
II=the exchange of heat between the liquid and the gas at the interface and through the walls of the tank
III=the power released by the gas passing through the vaporizer to the inside of the tank in the gaseous phase (proportionate to the height of gas present in the tank for pipes located between the walls)

Thus, by substituting equation 25 into equation 24, the enthalpy balance for the gaseous phase Hg can be written (equation 26):

$$mg\frac{dHg}{dt} = hpSg(Tamb - Tg) +$$

$$hlgSlg(Tl - Tg) + \frac{hg}{total\_length}\dot{m}_{prc}(Hg(Tamb) - Hl(Tl)) +$$

$$\dot{m}_{vap}(Hg(Teq) - Hg(Tg)) + Vg\frac{dPg}{dt}$$

The same relationships as above apply to the liquid phase, giving rise to the following equations 27 and 28 (where "l" replaces "g"):

$$\frac{dml}{dt} = \underbrace{-\dot{m}_{vap}}_{I} \underbrace{-\dot{m}_{prc}}_{II} \underbrace{-\dot{m}_{cons}}_{III}$$

$$\frac{d(ml \cdot el)}{dt} = \underbrace{-\dot{m}_{prc}Hl(Tl)}_{I} - \underbrace{\dot{m}_{cons}Hl(Tl)}_{II} + \underbrace{Q}_{III}$$

In the above mass balance equation 27, the terms I, II and III define:
I=$\dot{m}_{vap}$ the mass flow rate leaving the vaporization stage
II=$\dot{m}_{prc}$ the outgoing mass flow rate vaporized in the vaporizer
III=$\dot{m}_{cons}$ the outgoing mass flow rate consumed by the user of the tank.

As far as the energy balance applied to the liquid phase is concerned, terms I, II, III of equation 28 above have the following meanings:
I=$\dot{m}_{prc}Hl(Tl)$=outgoing power when the vaporizer is operating
II=$\dot{m}_{cons}Hl(Tl)$=outgoing power when the liquid is being consumed by the customer
III=Q=internal thermal power.

Mechanical work is neglected in equation 28 because the liquid is considered to be incompressible. The power associated with vaporization is not taken into consideration because this equation is used only when there is precisely no vaporization (the temperature of the liquid is below the equilibrium temperature $T_l < T_{eq}$).

By contrast, when the temperature of the liquid is above the equilibrium temperature $T_l \geq T_{eq}$, the power entering the system will not increase the temperature of the liquid but will vaporize it.

This then yields the following relationship (equation 29):

$$\dot{m}_{vap}(Hg(Teq) - Hl(Tl)) = Q$$

Just as was the case for the liquid phase, the total thermal power entering the liquid phase is made up of three terms I, II, III (equation 30):

$$Q = \begin{cases} \underbrace{hp \cdot Sg(Tamb - Tl)}_{I} + \underbrace{hlgSlg(Tl - Tg)}_{II} + \\ \underbrace{\dfrac{hl}{total\_length}\dot{m}_{prc}(Hg(Tamb) - Hl(Tl))}_{III} \\ \text{for pipework between the walls} \\ \underbrace{hp \cdot Sg(Tamb - Tl)}_{I} + \underbrace{hlgSlg(Tl - Tg)}_{II} \\ \text{for pipework outside the walls} \end{cases}$$

with
hp: the coefficient of exchange between the ambient surroundings and the gas in the tank
hlg: the coefficient of heat exchange between the gas and the liquid in the tank.

$Slg = \pi R^2 =$ surface area

The first term (I) represents natural convection between the ambient external surroundings and the liquid inside the tank.

The second (II) represents the natural convection between the liquid and the gas at the interface, and the third (III) represents the other part of the energy released by the gas passing through the vaporizer 3 and which is not taken into consideration in the equation applied to the gas.

By using equations 27 to 30 above, the enthalpy balance for the liquid phase can be expressed as follows (equation 31):

a) if $Tl < Teq$ $$\begin{cases} ml\dfrac{dHl}{dt} = hpSl(Tamb - Tl) + hlgSlg(Tg - Tl) + \\ \dfrac{hl}{total\_length}\dot{m}_{prc}(Hg(Tamb) - Hl(Tl)) \\ \dot{m}_{vap} = 0 \end{cases}$$

b) if $Tl \geq Teq$ $$\begin{cases} Hl + Hl(Teq) \\ hpSg(Tam - Tl) + hlgSlg(Tg - Tl) + \\ \dot{m}_{vap} = \dfrac{\dfrac{hl}{total\_length}\dot{m}_{prc}(Hl(Tamb) - Hl(Tl))}{(Hg(Teq) - Hl(Tl))} \end{cases}$$

Constant Flux Model:

A simplified model of the thermodynamic behavior of the tank between two filling operations can be established on the basis of the following conditions:

1) the rate at which the withdrawn liquid is consumed is constant
2) the gas is always at liquid-gas equilibrium, both in the tank and in the pipework
3) the specific heat of the liquid is constant $C_{pl}$
4) the effect of the vaporizer is negligible
5) all of the heat passing through the walls is absorbed by the liquid.

When these conditions are met, the correction of the measured pressure differential DP=PB−PH can be expressed, in both of the scenarios introduced hereinabove, in the following form (equation 32):

$$\begin{cases} PH = PH + \rho g\_pipe \cdot g(H\max + of\_len - hl1) \\ PB = PB_B - \rho g\_pipe \cdot g \cdot hl1 \end{cases}$$

$$DPreal = DP + \rho g\_pipe \cdot g(H\max + of\_len)$$

In this model, the density of the liquid in the piping ρg_pipe is considered at ambient temperature in the first scenario (FIG. 1) and at the equilibrium temperature in the second (FIG. 2).

hp·Stot, which represents the power exchanged per degree of temperature difference, can be calculated as a function of the mass flow rate of liquid vaporized and the latent heat of liquid oxygen at ambient temperature (298° K.) using the following equation 33:

$$hpStot = \frac{\Delta Hlatent_{atm}^{O_2} \cdot \dot{m}_{lossO_2}}{\tilde{T}amb - Teq_{atm}^{O_2}}$$

Hlatent being the latent heat of vaporization of oxygen $O_2$ at atmospheric pressure, $\dot{m}_{lossO_2}$ being the mass flow rate of lost oxygen characteristic of the tank, $\tilde{T}amb$ being the ambient temperature relating to the measurement of $\dot{m}_{lossO_2}$.

The change in the temperature of the liquid is given by the following equation 34:

$$\begin{cases} mlCpl\dfrac{dTl}{dt} = hpStot(Tamb - Tl) \xrightarrow{If} Tl < Teq \\ Tl = Teq \xrightarrow{If} Tl \geq Teq \end{cases}$$

With Cpl=the specific heat of the liquid being constant.
From the first condition, the variation in the mass of the liquid can be deduced from the following formula 35:

$$ml = m_{init} - \dot{m}_{cons}t$$

With ml=mass of liquid; $m_{init}$=initial mass and $\dot{m}_{cons}$=mass flow rate consumed by the customer.

By substituting that into equations 33 and 34 and by considering ambient temperature Tamb to be constant, the following differential equation is obtained (equation 36):

$$-\frac{dTl}{dt} = \frac{d(Tamb - Tl)}{dt} = \frac{hpStot(Tamb - Tl)}{(m_{init} - \dot{m}_{cons}t)Cpl}$$

With Tl=temperature of the liquid
This is a separable differential equation the solution of which can be obtained without difficulty by integrating between the temperature T at the initial moment Tinit and the temperature at the moment T(t) (equation 37):

$$-\int_{Tinit}^{T(t)} \frac{d(Tamb - Tl)}{(Tamb - Tl)} = \int_0^t \frac{hpStot \cdot dt}{(m_{init} - \dot{m}_{cons}t)Cpl}$$

The solution to equation 37 is given by equation 38 below:

$$\begin{cases} Tl(t) = Tamb - (Tamb - Tinit)\left(\dfrac{m_{init} - \dot{m}_{cons}t}{m_{init}}\right)^{\frac{hpStot}{\dot{m}_{cons}Cpl}} \xrightarrow{if} Tl < Teq \\ Tl = Teq \xrightarrow{if} Tl \geq Teq \end{cases}$$

Estimating the Temperature after Filling:
Filling with a colder liquid leads to a drop in the temperature in the tank. In both the models (the constant flux model and the detailed model) described hereinabove an enthalpy balance between the fluid remaining in the tank and the liquid delivered is determined. That makes it possible to estimate the temperature of the liquid after filling and the mass of liquid that can be delivered.

During filling, there is a reduction in the mass of gas and this may be connected with two distinct effects.

The first effect is the condensing of gas due to the cold liquid injected at the top. The second effect is removal of gas through the safety valve.

Filling from the top promotes the first effect while filling from the bottom promotes the second.

In both the estimation models considered hereinafter, either the gas discharged by the valve (in the model with condensation) is neglected, or it is estimated that the entire lost mass of gas is discharged through the valve (in the model without condensation).

Model with Condensation:
By applying the enthalpy balance between the fluid remaining in the truck and the liquid in the truck the resultant equation can be written (equation 39):

$$Hl\_after \cdot ml\_after + Hg\_after \cdot mg\_after = ml\_bef \cdot Hl\_bef + ml\_deliv \cdot Hl\_deliv + mg\_bef Hg\_bef$$

Hl_after being the enthalpy of liquid after delivery, ml_after being the mass of liquid after delivery, Hl_bef being the enthalpy of liquid before delivery, ml_bef being the mass of liquid before delivery, Hl_deliv being the enthalpy of the liquid delivered, ml_deliv being the mass of liquid delivered, the same designations applying to gas with "g" in place of "l".

In this equation, the mass delivered to the tank ml_deliv is (equation 40):

$$ml\_deliv = ml\_after + mg\_after - ml\_bef - mg\_bef = Vl\_max \cdot \rho l\_after + Vg\_after \cdot \rho g\_after - ml\_bef - mg\_bef$$

In order to obtain an equation that is a function only of the temperature of the liquid Tl after filling, the working assumptions are as follows:
the filling is 100%, that is to say that the liquid level is at the maximum Hmax, the volumes of gas and of liquid are known,
the temperature of the gas is at equilibrium after filling.

Using these two assumptions it is possible to determine the temperature after filling and the mass delivered during filling.

Model without Condensation:
In this model, the gas is not considered and the resulting equations are (equation 41):

$Hl\_mix \cdot ml\_after = ml\_bef \cdot Hl\_bef + ml\_deliv \cdot Hl\_deliv$ with $ml\_deliv = ml\_after - ml\_bef = Vl\_max \cdot \rho l\_after - ml\_bef$ Hlmix being the enthalpy of the liquid mixture after filling.

The same assumptions are kept for calculating the temperature after filling and the mass that can be delivered during the filling.

This first model underestimates the mass actually delivered during filling because it does not consider losses of gas (vented by the valve). The second model (without condensation) will overestimate the mass actually delivered because it considers that the reduction in mass during filling is due solely to venting, and it will therefore replace this mass with liquid from the delivery truck.

A numerical estimate can be conducted mathematically using:
- the letter u for measured data used as inputs (measured pressure differential DP and one measured pressure, for example PB),
- the letter x for variables (temperature of the liquid and of the gas (Tl Tg),
- the letter p for parameters that are constant.

Using this method, in each time step, the mass of liquid ml and the mass of gas mg in the tank are calculated on the basis of the measured input data. Once the physical parameters have been measured, the calculation may comprise three phases:
1) initialization
2) simulation of the behavior of the tank between two filling operations,
3) reinitialization when filling has been detected.

FIG. 3 illustrates the process schematically: having measured the physical parameters (u=pressure differential step 100) an initialization process is performed (step 101, FIG. 3).

Following initialization (101) iteration is used for each time step to calculate the values of temperature and mass since the last filling (step 102). If a filling is detected (step 103; "Y", step 104), the method calculates the mass of liquid delivered mdeliv and the liquid Tl, and gas Tg temperatures, the masses of liquid ml and of gas mg after filling using the above model. As long as no filling is detected (N, steps 103 and 105), the method continues to use iteration to calculate, for each time step, the values of the temperatures of the liquid Tl, the temperature of the gas Tg, the mass of the liquid ml and the mass of gas mg.

In order to initialize the first liquid temperature Tl and gas temperature Tg values, the method makes the following assumptions:
- the first calculation point corresponds to the time of a complete filling (100%) when the level of liquid hl=Hmax is a maximum and the level of gas is a minimum
- the gas is at saturation in the state of equilibrium.

The first assumption is based on the fact that liquid is removed through an overflow (the operator needs to make sure of this during filling). The second assumption is based on the fact that during filling a large proportion of the gas condenses (especially when filling from the top), and the remaining gas can be considered to be in equilibrium.

Iterating on the calculation until convergence is reached leads to a reliable initial value for the temperature of the liquid Tl0 (FIG. 4).

The real pressure differential DPreal can then be calculated using equation 12 as a function of this initial liquid temperature Tl0, as a function of the temperature of the gas Tg, as a function of the measured pressure differential DP=u and as a function of the constants p (step 200, FIG. 4).

The value of the real pressure differential DPreal allows the density of the liquid at this moment $\rho l$ to be calculated using the formula of step 201. With hg the height of gas, $\rho g$ the density of the gas, hl the height of liquid, and g the Earth's gravitational pull.

Depending on the pressure and density of liquid that have been obtained, it is possible to calculate a new temperature Tl1 for the liquid (step 202, applying, for example, an equation representing the liquid temperature Tl as a polynomial function of the density $\rho l$).

The difference between the new calculated temperature value Tl1 and the previous one Tlo is calculated. If this difference Diff is above a threshold S, the procedure recommences at step 200 using the new calculated temperature value Tl1. If not, the new temperature Tl1 is adopted as the initial temperature.

Next, following initialization (initial liquid temperature adopted), the differential equation for the temperatures of the gas and of the liquid is solved by iteration (for example using the Euler method).

According to these equations, the estimation procedure may run as follows:
- initializing the integration step using the liquid and gas temperatures obtained in the previous iteration and measuring the pressure differential DP,
- correcting the differential using equation 12
- calculating the heights, volume, mass and density of the liquid and of the gas
- estimating new liquid and gas temperature values by discretizing equations 26 and 31
- calculating the differences between the new temperatures obtained and the previous temperatures,
- if the differences are above a convergence threshold, the iteration is recommenced with the last temperature values obtained.

This process is used to estimate the evolution with respect to time of the temperatures as long as a new filling operation is not detected.

A filling operation is detected when there is an increase above a set threshold in the measured differential pressure.

Determining the level of fill of the tank makes it possible thus to determine the quantity of fluid that can be delivered in the tank at any moment.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for determining, in real time, the level of fill of a cryogenic tank intended to contain a diphasic liquid-gas mixture, in which method at least one of: the level, the volume or the mass contained in the tank is calculated at each time step (t, t+Δt . . . ) for the liquid, and possibly also for the gas, the method measuring in each time step the pressure differential (DP=PB−PH) (in Pa) between the upper and lower parts of the tank and at least one of the pressures (PH, PI) of said differential, wherein the method:

a) uses a thermal model at each time step (t, t+Δt . . . ) to calculate the mean temperatures of the liquid (Tl) and of the gas (Tg) in the tank from the measured pressure differential (PB−PH) and from at least one of the pressures (PH, PI) of said differential;

b) calculates the evolution over time (t, t+Δt ... ) at least of the density of the liquid (ρl) (in kg/m³) from the mean temperature of the liquid (Tl) and from the pressures (PH) (PB) in the tank; and c) calculates the liquid level (hl) (in m) in the tank by applying to the liquid the general law of hydrostatics of the type:

$$dP = -\rho l \cdot g \cdot dhl$$

from the calculated liquid density (ρl) (with dP being the variation in pressure of the liquid, ρl being the density of the liquid, g being the Earth's acceleration due to gravity, and dhl being the variation in height of the liquid).

2. The method of claim 1, wherein the method calculates the density of the liquid (ρl) and, at each moment (t+Δt ... ) from, on the one hand, the mean temperature of the liquid (Tl) obtained and estimated at the preceding moment (t) and, on the other hand, the pressure differential (PB−PH) and at least one of the measured pressures (PH, PI) of said differential (DP).

3. The method of claim 2, wherein the method calculates the density of the gas (ρg) at each moment (t+Δt ... ) from, on the one hand, the mean temperature of the gas (Tg) obtained and estimated at the preceding moment (t) and, on the other hand, the pressure differential (DP=PB−PH) and at least one of the measured pressures (PH, PI) of said differential.

4. The method of claim 1, wherein the method calculates the density of the gas (ρg) at each moment (t+Δt ... ) from, on the one hand, the mean temperature of the gas (Tg) obtained and estimated at the preceding moment (t) and, on the other hand, the pressure differential (DP=PB−PH) and at least one of the measured pressures (PH, PI) of said differential.

5. The method of claim 4, wherein the thermal model in each time step (t+Δt) calculates the mean temperatures of the liquid and of the gas (Tl, Tg) in the tank from, on the one hand, the measured pressure differential (DP=PB−PH) and at least one of the pressures (PH, PI) of said differential and, on the other hand, from the temperatures of the liquid and of the gas (Tl, Tg) known during the preceding moment (t).

6. The method of claim 1, wherein the thermal model in each time step (t+Δt) calculates the mean temperatures of the liquid and of the gas (Tl, Tg) in the tank from, on the one hand, the measured pressure differential (DP=PB−PH) and at least one of the pressures (PH, PI) of said differential and, on the other hand, from the temperatures of the liquid and of the gas (Tl, Tg) known during the preceding moment (t).

7. The method of claim 6, wherein the model uses, as its starting value for the temperature of the liquid (Tl) and of the gas (Tg), the initial temperature values obtained during a complete filling of the tank, the level of the liquid (hl) at this known moment of complete filling being the known level of the overflow spillway of the tank.

8. The method of claim 7, wherein the model uses the following calculation approximation: the gas after complete filling is at liquid-vapor equilibrium at the pressure of the tank.

9. The method of claim 8, wherein the model uses the following calculation approximation: the liquid and the gas are constantly isothermal each in their respective volumes but at respective temperatures that may differ.

10. The method of claim 1, wherein the model uses the following calculation approximation: the liquid and the gas are constantly isothermal each in their respective volumes but at respective temperatures that may differ.

11. The method of claim 10, wherein the model calculates, for each time step, the mean temperatures of the liquid and of the gas (Tl, Tg) in the tank from the mass (m) and energy balances modeled and applied separately to the liquid and to the gas both contained in the tank.

12. The method of claim 1, wherein the model calculates, for each time step, the mean temperatures of the liquid and of the gas (Tl, Tg) in the tank from the mass (m) and energy balances modeled and applied separately to the liquid and to the gas both contained in the tank.

13. The method of claim 12, wherein the mass and energy balances modeled and applied separately to the liquid and to the gas both contained in the tank are taken at a moment (t+Δt) on the basis of the liquid and gas density and volume values calculated from an estimate of the temperatures of the liquid and of the gas at the preceding moment (t), and in that the model iterates on calculating the mean temperatures of the liquid and of the gas (Tl, Tg) in the tank until such moment as the mean temperatures of the liquid and of the gas (Tl, Tg) calculated at a moment (t+Δt) converge from a predetermined value toward the temperatures estimated at the preceding moment (t), and in that, after convergence, the method recommences the steps of calculating the temperatures (Tl, Tg), liquid density (ρl) and liquid level (hl) for the next moment (t+2Δt).

14. The method of claim 13, wherein the mass and energy balances modeled and applied to the gas use the enthalpy equation whereby the variation in enthalpy (Hg) of the gas corresponds to the exchanges of heat and of mass applied to the gas, that is to say taking account at least of one of the following exchanges: the exchange of heat between the liquid and the gas, the exchange of heat between the outside of the tank and the gas, the exchange of heat supplied by any vaporization heater (3) generally situated underneath the tank, the vaporization of liquid in the tank.

15. The method of claim 12, wherein the mass and energy balances modeled and applied to the gas use the enthalpy equation whereby the variation in enthalpy (Hg) of the gas corresponds to the exchanges of heat and of mass applied to the gas, that is to say taking account at least of one of the following exchanges: the exchange of heat between the liquid and the gas, the exchange of heat between the outside of the tank and the gas, the exchange of heat supplied by any vaporization heater (3) generally situated underneath the tank, the vaporization of liquid in the tank.

16. The method of claim 15, wherein it comprises a measurement of temperature in the external vicinity of the tank so as to calculate the exchange of heat between the outside and the tank.

17. The method of claim 15, wherein the mass and energy balances modeled and applied to the liquid use the enthalpy equation whereby the variation in enthalpy of the liquid (Hl) corresponds to the exchanges of heat and of mass applied to the gases, that is to say taking account at least of one of the following exchanges: the exchange of heat between the outside and the liquid, the exchange of heat between the gas and the liquid, the exchange of heat supplied by any vaporization heater generally situated underneath the tank, the vaporization of liquid in the tank, the consumption of liquid withdrawn by a user of the tank.

18. The method of claim 12, wherein the mass and energy balances modeled and applied to the liquid use the enthalpy equation whereby the variation in enthalpy of the liquid (Hl) corresponds to the exchanges of heat and of mass applied to the gases, that is to say taking account at least of one of the following exchanges: the exchange of heat between the outside and the liquid, the exchange of heat between the gas and the liquid, the exchange of heat supplied by any vaporization heater generally situated underneath the tank, the vaporization of liquid in the tank, the consumption of liquid withdrawn by a user of the tank.

19. The method of claim 18, wherein it comprises a measurement of temperature in the external vicinity of the tank so as to calculate the exchange of heat between the outside and the tank.

20. The method of claim 1, wherein the pressure differential (DP=PB−PH) between the upper and lower parts of the tank is measured by at least one remote pressure sensor connected to the upper and lower parts of the tank via respective measurement pipes, characterized in that the method corrects the calculated liquid level (hl) and/or the measured pressure differential (PB−PH) by taking account of an additional pressure difference value (DPpipe) created by the gas present in the measurement pipes, the pressure differential (DP=PB−PH) measured remotely between the upper and lower parts of the tank being connected to the so-called "real" pressure differential between the upper and lower parts of the tank (DPreal) by the formula:

$$DP=PB-PH=DPreal-DPpipe.$$

21. The method of claim 20, the tank being of the double-walled type with a vacuum in the volume between the walls, wherein the additional pressure difference value (DPpipe) is calculated by adding or subtracting the levels of gas and of liquid in the measurement pipes taking the calculated liquid level (hl) into account and neglecting the pressure influence of the portions of pipe lying in the space between the walls.

22. The method of claim 21, wherein when the upper pressure measurement pipe connected to the upper part of the tank is situated outside the tank, the additional pressure difference value (DPpipe) is calculated using a formula of the type:

$$DPpipe=\rho g\_pipe \cdot g \cdot (2len\_w+total\_length)$$

in which $\rho g\_pipe$ is the density of the gas at ambient temperature (outside the tank), g is the Earth's acceleration due to gravity, $len\_w$ is the thickness of the wall of the tank and $total\_length$ is the total height of the internal tank, and in that, when the upper pipe is situated inside the tank in the space between the walls, the value of the additional pressure difference (DPpipe) is calculated using a formula of the type:

$$DPpipe=DPside\_gas+DPside\_liq;$$

DPside_gas being the pressure difference in that part of the pipe connected to the upper part of the tank and on the gas side of the tank, Dpside_liq being the pressure difference in that part of the upper pipe lying on the liquid side of the tank; DPside_gas being obtained using the formula DPside_gas=$\rho_{side\_gas} \cdot g \cdot hg$ in which $\rho_{side\_gas}$ is the density of the gas in the pipe calculated at a representative temperature of the pipe, g being the Earth's acceleration due to gravity and hg being the height of gas in the tank; DPside_liq being obtained using the formula DPside_liq=$\rho_{side\_liq} \cdot g \cdot hl$ in which $\rho_{side\_liq}$ is the density of the gas in the upper pipe on the liquid side of the tank calculated at a representative temperature of the pipe, g being the Earth's acceleration due to gravity and hl the height of liquid in the tank.

23. A method of dynamically determining the level of fill of a cryogenic tank intended to contain a diphasic liquid-gas mixture, as claimed in any one of the preceding claims, comprising a step of measuring a pressure differential (DP=PB−PH) between levels situated respectively at the bottom and top ends of the tank, wherein it comprises a calculation of a volume and/or of a mass of liquid in the tank from a measured pressure differential (DP), from the known or estimated geometry of the tank, and from at least one density of liquid in the tank, the method further comprising the steps of calculating the following parameters for a moment (t+Δt):

a) a first step of calculating a density (ρl) of the liquid in the tank from pressure measurements (PB, PH) at the bottom and top ends of the tank respectively, and from the value, estimated at the preceding moment (t), of a temperature Tl of the liquid in the tank, b) a second step of calculating the level of liquid (hl) in the tank by applying to the liquid the law of hydrostatics of the type:

$$dP=-\rho l \cdot g \cdot dhl$$

from the density (ρl) of the liquid as calculated in the preceding step, c) a third step of calculating the pressure level (PI) at the interface between the liquid phase and the gas phase in the tank from the calculated level of liquid (hl) in the tank, d) a fourth step of calculating the volume of liquid (hl) and of gas in the tank from the liquid level calculated in the second step, e) a fifth step of calculating the energy balance applied to the gas in the tank using the equation stating the variation in enthalpy of the gas and taking into account at least one of the following exchanges of heat: the exchange of heat between the liquid and the gas, the exchange of heat between the outside of the tank and the gas, the exchange of heat supplied by any vaporization heater situated in the tank, and the vaporization of liquid in the tank, f) a sixth step of calculating the energy balance applied to the liquid in the tank from the equation stating the variation in enthalpy of the liquid and taking into account at least one of the following exchanges: the exchange of heat between the outside and the liquid, the exchange of heat between the gas and the liquid, the exchange of heat supplied by any vaporization heater situated in the tank, and the vaporization of liquid in the tank, g) a seventh step of calculating the temperature Tg of the gas from the energy balance of the fifth and sixth steps, and h) an eighth step of comparing the temperature T(t+Δt) calculated for the moment following on from the seventh step against the temperature T(t) estimated for the preceding moment, and when the difference between the temperature T(t+Δt) calculated for the moment following on from the seventh step and the temperature T(t) estimated for the preceding moment is above a set threshold: a step of returning to the second step and of iterating until convergence is reached, when the difference between the temperature T(t+Δt) calculated for the moment following on from the seventh step and the temperature T(t) estimated for the preceding moment is below a threshold (convergence is reached): repeating the above steps for the moment (t+2Δt) using the pressure values measured for that moment.

* * * * *